United States Patent [19]

Josse

[11] Patent Number: 5,052,300
[45] Date of Patent: Oct. 1, 1991

[54] PYROTECHNIC PRIMING DEVICE HAVING A MICROLENS SET BY A SHAPE MEMORY MATERIAL AND PYROTECHNIC CHAIN UTILIZING SAID DEVICE

[75] Inventor: Alain P. Josse, Saint Medard en Jalles, France

[73] Assignee: Societe Nationale Industrielle et Aerospatiale, Paris, France

[21] Appl. No.: 516,200

[22] Filed: Apr. 30, 1990

[30] Foreign Application Priority Data

May 12, 1989 [FR] France ................. 89 06286

[51] Int. Cl.⁵ .......................................... F42C 19/00
[52] U.S. Cl. .................................................... 102/201
[58] Field of Search ......................................... 102/201

[56] References Cited

U.S. PATENT DOCUMENTS

| | | | |
|---|---|---|---|
| 3,362,329 | 1/1968 | Epstein | 102/201 |
| 3,528,372 | 9/1970 | Lewis et al. | 102/201 |
| 3,618,526 | 11/1971 | Baker | 102/201 |
| 3,724,383 | 4/1973 | Gallaghan et al. | 102/201 |
| 3,812,783 | 5/1974 | Yang et al. | 102/201 |
| 3,911,822 | 10/1975 | Boling | 102/201 |
| 4,352,542 | 10/1982 | Tydings | 350/96.21 |
| 4,743,084 | 5/1988 | Manning | 350/96.21 |
| 4,870,903 | 10/1989 | Carel et al. | 102/201 |
| 4,920,418 | 6/1990 | Folsom | 102/201 |

FOREIGN PATENT DOCUMENTS

| | | |
|---|---|---|
| 2311952 | 4/1975 | France . |
| 2353069 | 5/1977 | France . |
| 2509037 | 7/1982 | France . |
| 2596530 | 3/1986 | France . |
| 2580822 | 4/1986 | France . |
| 0292383 | 5/1988 | France . |

Primary Examiner—Charles T. Jordan
Attorney, Agent, or Firm—Hayes, Soloway, Hennessey & Hage

[57] ABSTRACT

A miniature photopyrotechnic priming device having a hollow body (18) for receiving a pytotechnic substance (24). A rigid index gradient microlens (30) is mounted in the hollow body for focusing a high energy beam having a given wavelength onto the pyrotechnic substance. A shape memory alloy or metal ferrule (32) is located in the hollow body (18) which has a smaller internal diameter at ambient temperature than the diameter of the microlens. A connector (34) fixed to the body (18) secures the microlens-ferrule assembly and an optical fiber (12) carrying the laser beam.

14 Claims, 4 Drawing Sheets

PYROTECHNIC PRIMING DEVICE HAVING A MICROLENS SET BY A SHAPE MEMORY MATERIAL AND PYROTECHNIC CHAIN UTILIZING SAID DEVICE

BACKGROUND OF THE INVENTION

1. Field of the Invention

The present invention relates to a tight, hermetic, miniature pyrotechnic priming device used in the formation of a pyrotechnic chain initiated by a high energy beam supplied by a laser source.

This type of pyrotechnic chain has mainly been developed for ballistic applications involving weight and volume problems linked with the number of pyrotechnic functions to be carried out.

The inventive pyrotechnic priming device is able in all cases to replace and optimize the hitherto used conventional pyrotechnic components for all and in particular high energy pyrotechnic applications.

A photopyrotechnic functional chain utilizing the light energy from a laser source as the stimulus for initiating pyrotechnic substances, which can be carried on ballistic missiles, is constituted by three main elements, namely a "laser station", an optical cable for carrying the light energy and a pyrotechnic component of the detonator or firing device type connected to the optical cable. The laser station essentially comprises a laser source, optical switches and a control logic. The laser source can operate in the triggered mode or in the relaxed mode.

The term "optical cable" is understood to mean both an optical fibre and a bundle of optical fibres. The term "pyrotechnic substance" is understood to mean primary explosives such as nitrides, fulminates, tetrazines, etc., secondary explosives such as PETN, RDX, HNS, etc., and pyrotechnic compositions such as igniting, illuminating, tracer, smoke producing and similar compositions.

The term "high energy" imposes the exclusive use of secondary explosives or pyrotechnic compositions, whose sensitivity thresholds to the different safety tests are equal to or below those of trimethylene nitro amine.

A pyrotechnic detonator is a device charged with primary and/or secondary explosives which can be initiated under the action of a laser beam and making it possible to obtain an adequate shockwave for initiating another pyrotechnic component charged with secondary explosive. The operating conditions of such a detonator is detonation. With respect to the pyrotechnic firing devices, they contain a pyrotechnic substance which can ignite when it receives an adequate heat supply, e.g. in the form of a laser beam, whereby said flame can lead to the firing of another pyrotechnic composition. The operating conditions of a firing device is combustion or deflagration.

The pyrotechnic device according to the invention constitutes both a detonator and a pyrotechnic firing device.

2. Brief Description of the Prior Art

Most presently known photopyrotechnic priming devices have a poor seal and/or hermiticity with respect to the exterior, which has two disadvantages. Firstly the pyrotechnic priming substance is poorly protected against external influences (moisture and varyingly corrosive atmosphere), which can be very prejudicial to its operation. Moreover, during the firing of the pyrotechnic charge, efficiency losses can occur as a result of gas leaks caused by the pyrotechnic charge during detonation, as well as risks of polluting surrounding equipment and in particular the "laser station".

Recently FR-A-2 615 609 has given consideration to a pyrotechnic priming device having a hollow body for receiving a pyrotechnic charge initiated by a laser beam, whose focussing is ensured with the aid of a truncated cone-shaped sapphire optics located in the body of the device. The fitting of said optics associated with a seal also protects the pyrotechnic charge against external influences. The construction of said optics also makes it possible for the same to withstand mechanical effects produced during the operation of the charge, so that there are no gas leaks through the passage provided for the laser beam.

Although this device solves a certain number of problems compared with the earlier devices, it still suffers from excessively large overall dimensions when it is to be used on ballistic missiles. In particular, the truncated cone-shaped optics is associated with one or two other lenses located at a relatively large distance from said optics and has relatively large diameters. Moreover, the sealing and/or hermiticity of said device are still inadequate.

The invention also relates to a miniature photopyrotechnic priming device having improved sealing and/or hermiticity compared with those of the prior art photopyrotechnic devices.

It is also known from FR-A-2 311 952 to maintain a lens in a hollow body with the aid of a thermoretractable plastics sheath. Such a thermoretractable sheath cannot be used in the pyrotechnic field. Thus, chemical incompatibility exists between the plastics sheath and the explosive products (the intermolecular migration can introduce a "desensitization" of the explosive, which may lead to non-detonation or non-deflagration). In the pyrotechnic field, a desensitizing substance is one which reduces the sensitivity of the explosive to shocks and friction.

Moreover, a thermoretractable sheath has a very limited thickness and leads to a problem of the resumption of the mechanical strength on the body, a sealing problem and a hermiticity problem which are not solved (cylindrical irregularity of the sheath, aging of the plastics material in particular use conditions and the sheath can slide with the vibrations). Finally, the fitting of a thermoretractable sheath needs a temperature rise up to 125° C.

SUMMARY OF THE INVENTION

More specifically, the invention relates to a miniature photopyrotechnic priming device having a hollow body sealed at one end and serving to receive a pyrotechnic substance, a rigid index gradient microlens inserted in a shape memory metal alloy or metal ferrule, fitted at the entrance to the hollow body and ensuring a tight, hermetic fixing of the microlens to the interior of the body, said microlens focussing a high-energy light beam of given wavelength onto the pyrotechnic substance.

The use of a microlens, i.e. a small lens, for focusing the light beam onto the pyrotechnic substance leads to a significant reduction in the overall dimensions of the photopyrotechnic device, both as regards the diameter and length. Hereinafter this microlens will be called the main microlens.

For fixing the main microlens in the body of the device, it would have been possible to use adhesion or bonding. However, the latter leads to a certain number of disadvantages such as the incompatibility of the adhesives used with the pyrotechnic substances, which can lead to performance losses with respect to the device, an inadequate sealing and/or hermiticity of the mechanical bonds between the microlens and the device body, as well as to a premature aging of the adhesives.

Furthermore, in order to ensure a perfect fixing of the main microlens in the body of the device with adequate sealing and/or hermiticity, as well as a retention of the optical and mechanical characteristics both with regards temperature and time, the said microlens is set by a shape memory alloy or metal ferrule designated hereinafter by SMA. In particular, the SMA ferrule has, at ambient temperature, an internal diameter smaller than the external diameter of the microlens.

This fixing of the main microlens ensures a respective sealing and/or hermiticity characterized by a leakage rate below $10^{-5}$ and $10^{-6}$ cm$^3$ of helium/second under an upstream-downstream pressure difference of $10^5$ Pascal for 2 minutes. Thus, the use of shape memory material makes it possible to closely adapt to the microlens shape.

The microlenses usable in the invention are index gradient microlenses, i.e. lenses whose refractive index radially decreases from the centre to the edge of the lens, or glass balls whose index is constant throughout the volume.

Preferably, use is made of index gradient microlenses shaped like a cylinder with a circular base. Their length varies from 3 to 15 mm and their diameter is less than 3 mm and in particular 1, 1.8 or 2 mm. However, it is also possible to use truncated cone-shaped microlenses.

In order to ensure an adequate setting, in particular retaining the initial optical characteristics of the main microlens prior to setting, the ratio of the microlens diameter D to the ferrule internal diameter d, at ambient temperature, is such that $1.005 \leq D/d < 1.020$.

Moreover, it is desirable for the ferrule thickness to be approximately 0.9 mm. Thus, for a thickness greater than 0.9 mm cracks or breakages are obtained in the microlens, whilst when the thickness is below 0.9 mm, the sealing and/or hermiticity are not completely satisfactory, although better than that of the prior art devices. It would appear that a mass or weight effect occurs on the fixing of the microlenses.

It is known to use shape memory metal parts for the centering and/or coupling of optical fibres in connectors, cf. U.S. Pat. No. 4,743,084 and U.S. Pat. No. 4,352,542. However, hitherto no-one has envisaged the setting of microlenses by a shape memory metal alloy or metal ferrule ensuring sealing and/or hermiticity in the pyrotechnic field.

This main microlens setting by a SMA ferrule secures same perfectly both before and after the operation of the pyrotechnic device and thus prevents any gas leak resulting from an explosion in the direction of the laser source used for initiating the charge. Moreover, the setting of the main microlens according to the invention causes no deformation and no attenuation of the charge-initiating light beam during its passage through the microlens after setting.

A SMA is a material, whose shape can be modified by the application of a stress at low temperature and the initial shape can be restored by heating. This phenomenon is one of the surprising thermomechanical properties associated with a reversible structural transformation of the thermoelastic martensitic type. The martensite phase is the crystallographic structure of the metal or alloy at low temperature. The high temperature phase corresponds to an austenitic structure.

The shape memory effect may or may not be reversible. It is not reversible when the lowering of the temperature of the material in the initial form does not make it possible to return to the shape realized by cold stress. The memory effect is reversible when, after an appropriate treatment of the material, it is possible to return to the shape realized by stress by simply lowering the temperature. A large number of passages between the austenitic and martensitic forms and dependent solely on the temperature is called the reversible memory effect.

In the invention, advantageously use is made of a non-reversible shape memory metal material, because the ferrule-microlens assembly is not dismantleable.

The known shape memory metal material used in the invention can be iron-based alloys (such as Fe-C, Fe-Cr, Fe-Ni), cuprous alloys or noble metals (such as Cu-Zn, Cu-Sn, Cu-Al, Cu-Al, Cu-Zn-Al, Cu-Zn-Al-Ni, Cu-Al-Ni, Ag-Cd, Au-Cd), titanium and/or nickel-based alloys (such as Ni-Ti, Ni-Ti-Fe, Ni-Al) or certain pure metals (Co, Ti, Na). The choice of the material and the relative percentages of the different constituents are dependent on the nature of the transformation and in particular the transition temperature of the martensitic phase to the austenitic phase, the temperature range relative to the application and the sought memory effect (reversible or non-reversible).

In particular, use is made of Cu-Zn-Al alloys due to the low transformation hysteresis, the ease of working them and their relatively low cost, their temperature characteristics between $-110°$ and $+120°$ C. being completely satisfactory for the envisaged application.

Generally, the light beam entering the pyrotechnic device is divergent. In addition, in order to improve the focusing of this beam onto the pyrotechnic substance leaving the main microlens and thereby increasing the efficiency of the photopyrotechnic initiation, upstream of said main microlens is fitted an auxiliary microlens rendering parallel the light beam from the laser source via the optical cable.

The auxiliary microlens is cylindrical or spherical. Its diameter is below 3 mm and its length (for a cylindrical lens) is between 2 and 10 mm. Its index can be constant throughout the volume or can decrease from the centre to the periphery.

In order to increase the sealing and/or hermiticity of the photopyrotechnic device prior to firing, use is advantageously made of a one-piece hollow body, unlike in the case of the prior art devices.

The priming device defined hereinbefore is intended for use in the formation of a high energy, photopyrotechnic functional chain, which can be installed on board a missile or the like. The invention also relates to this photopyrotechnic chain.

Other features and advantages of the invention can be gathered from the following description given in an illustrative and non-limitative manner with reference to the attached drawings, wherein show:

DETAILED DESCRIPTION OF THE PREFERRED EMBODIMENT

Figures 1, 6:
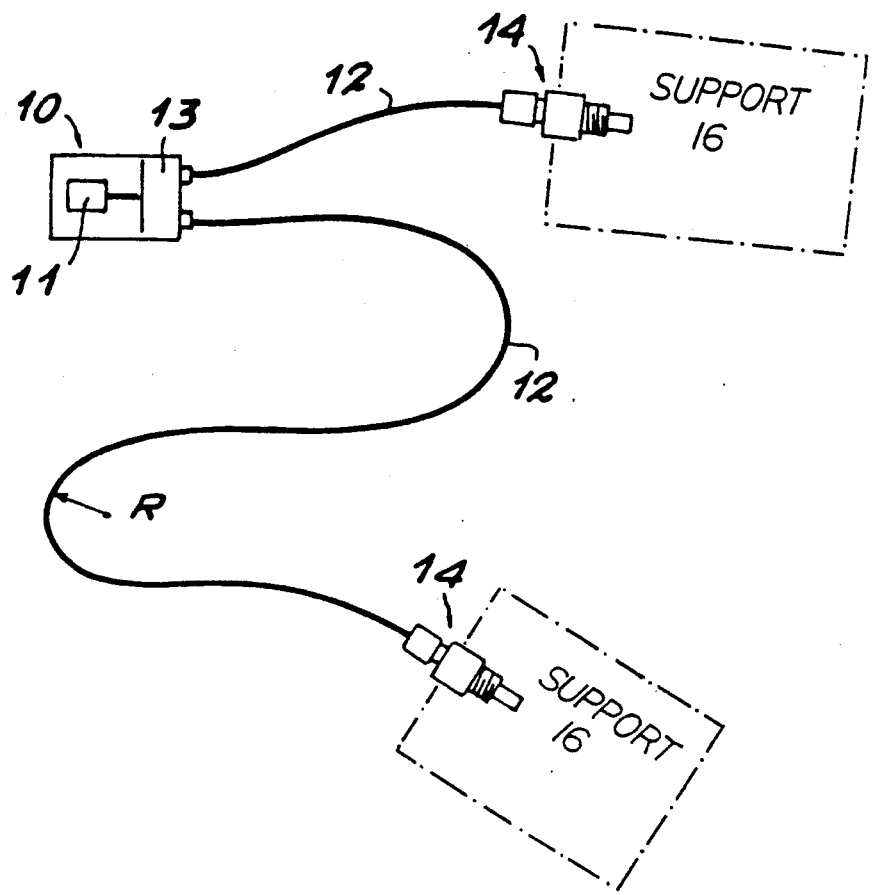
FIG. 1 a diagram illustrating a photopyrotechnic chain according to the invention.
FIG. 6 diagrammatically the fitting used for checking the nondeformation of the laser beam by the main microlens of the device of FIG. 2.

FIG. 1 diagrammatically shows a photopyrotechnic functional chain incorporating a laser station 10 essentially provided with a laser source 11 emitting a coherent light beam in the near infrared at the wavelength of 1060 nm and connected via an optical switching system 13 to several optical fibres 12 of the index jump type, whose core is of silica and which transmits the laser beam to miniature photopyrotechnic priming devices 14 according to the invention. The latter can be placed on separate supports 16 shown in mixed line form in FIG. 1. These supports are in particular the wall of containers or equipment containing main charges, which are to be initiated by the devices 14. These means are in particular relays for a detonator or firing device of an engine.

Figure 2:
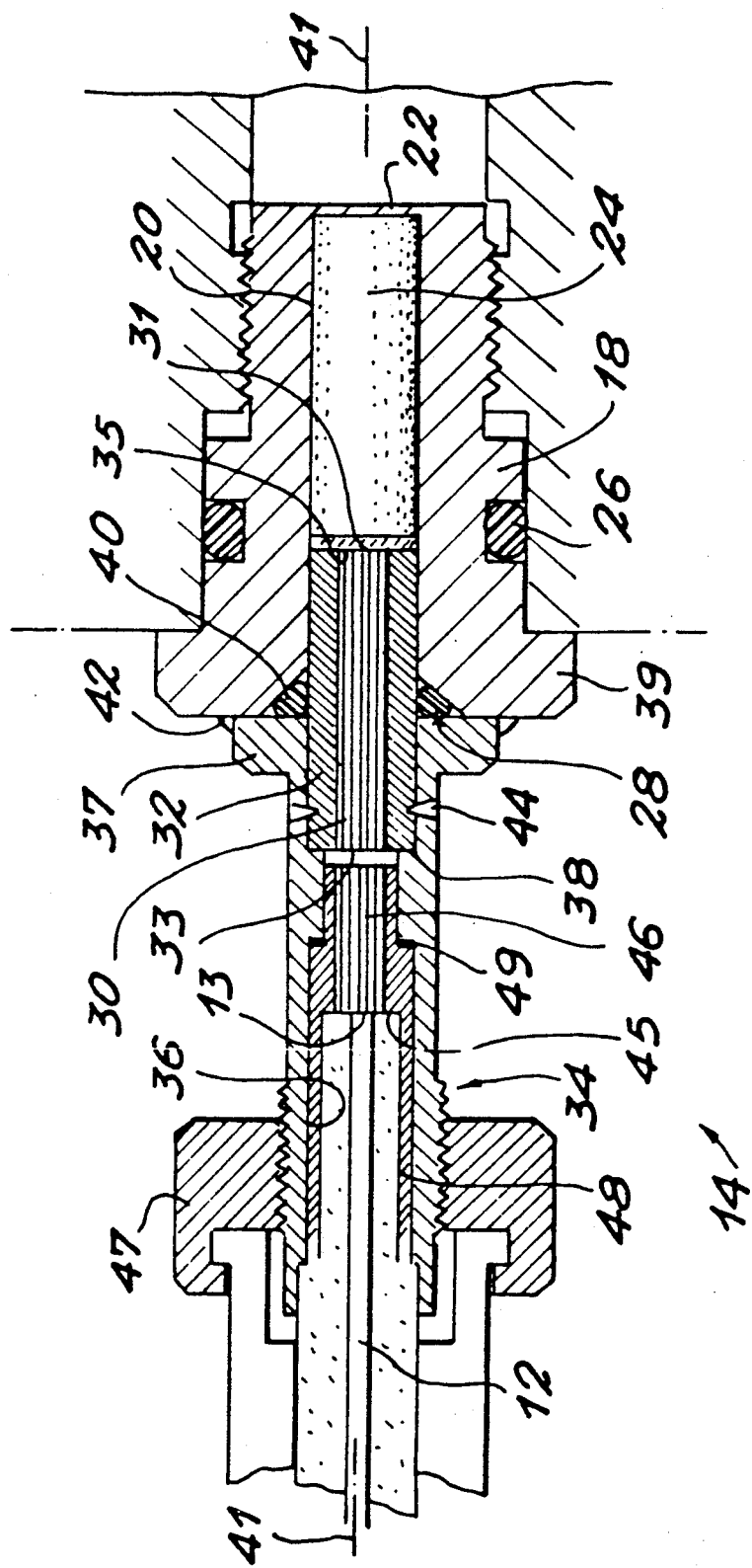
FIG. 2 a diagrammatic sectional view of an embodiment of the photopyrotechnic priming device according to the invention.

As shown in section in FIG. 2, each miniature device 14 has a generally tubular, stainless steel, one-piece body 18 in which is provided a constant diameter, cylindrical recess or bore 20. The latter is sealed at its end opposite to the laser station by a thin wall 22 forming an integral part of body 18. Bore 20 receives a pyrotechnic substance 24, which is in contact with the thin wall 22. It is either constituted by a single charge of the firing means type, or a double initiating and reinforcing charge of the detonator type. Body 18 is mounted by any known means on the support 16 and in particular by screwing. The seal between said support and the body 18 is ensured by an O-ring 26.

According to the invention, the pyrotechnic device body 18 has at its entrance 28 a cylindrical, convergent, index gradient main microlens 30, fixed in a shape memory alloy ferrule 32, e.g. of Cu-Zn-Al. The ferrule 32 and microlens 30 have the same length, the ends of the microlens and the ferrule being flush.

The setting of the microlens by a shape memory ferrule ensures between the microlens and the ferrule a sealing and/or hermiticity better than that provided by any joint or packing. Moreover, bearing in mind the small diameter of the microlens, the construction of a seal of this size would lead to serious technological problems. This also applies with respect to the seal enclosing the ferrule.

The microlens-ferrule assembly is located in the bore 20 of body 18, its end 31 opposite to the laser station being in contact with the pyrotechnic substance 24. This ensures the protection of the pyrotechnic substance with respect to the environment prior to firing and conversely the protection of the environment against the gases resulting from firing. This end 31 is generally covered with a preferably monolayer metal coating 35, constituted by vapour phase-deposited aluminium. The thickness of the coating is approximately 100 nm. This metal coating makes it possible to reduce the initiation threshold of the pyrotechnic charge 24 by a factor of 100. Obviously other materials, e.g. organic materials could be used in place of aluminium. In addition, said coating 35 is not obligatory.

The length of the microlens-ferrule assembly is such that its end 33, opposite to end 31, projects with respect to the entrance 28 of body 18.

A generally tubular connector 34 equipped with a stepped bore 36 is fixed to the entrance 28 of body 18. For this purpose, the end of the connector 34 opposite to the laser station 10 is equipped with a flange 37 bearing on the end 28 of body 18, which is also equipped with a flange 39. An annular laser weld 42 joins connector 34 and body 18 via flanges 37 and 39. At its end opposite to the laser station, the bore 36 of connector 34 has a shoulder 38 bearing on the end 33 of the microlens-ferrule assembly and ensuring the locking of the latter in body 18.

The sealing and/or hermiticity between the connector 34 and the body 18, as well as between the ferrule and the body 18 are ensured by an O-ring 40 level with flanges 37,39, as well as the laser weld 42, which also fixes the connector 34 to the body 18. In addition, an annular laser weld 44 in the vicinity of shoulder 38 of bore 36 of the connector completes the fixing of the microlens-ferrule assembly, whilst contributing to the seal between the ferrule and the body 18.

The entrance of connector 34 located on the side of the laser station receives the optical fibre 12 carrying the laser beam emitted by source 11.

The laser beam from the laser station 10 is generally divergent. In order to improve the focusing of this beam in the pyrotechnic substance 34, an auxiliary convergent microlens 46 is fitted upstream of the main lens 30. Microlens 46 is a cylindrical index gradient microlens having a circular base. It is fitted in a stepped bore, tubular lens holder 48 located in the connector 34. A shoulder 49 of bore 36 of the connector ensures the positioning of the lens holder 48.

Microlens 46 is fixed in the lens holder 48 by an adhesive or glue coating covering the entire periphery of the microlens 46. In the same way, the lens holder 48 is fixed by adhesion in the connector 34, and adhesive film covering all the facing portions of the lens holder and the connector.

In order to limit the overall dimensions of the priming device 14, the end of the lens holder 48 opposite to the laser source is, by mechanical mounting, in contact with the end of the ferrule 32 on the side of the laser source.

The optical fibre 12 is fixed in connector 34 by bonding the end 13 of the fibre opposite to the laser source to the end 45 of the microlens 46, positioned on the side of the laser source by using an adhesive. A nut 47 screwed to a threaded end of the connector 34 is able to complete the fixing of fibre 12 in the latter.

The connector-body assembly 34-18 equipped respectively with microlenses 46 and 30 mounted in the lens holder 48 and ferrule 32 is non-dismantleable according to the invention.

In order to ensure a good transmission of the light beam from the optical fibre to the pyrotechnic substance, i.e. with minimum losses, the optical axis of the optical fibre-microlens system coincides with the axis of revolution 41 of the pyrotechnic device 14. Thus, the connector 34, body 18, microlenses 30,46, ferrule 32 and lens holder 48 are fitted coaxially.

According to the invention, the photopyrotechnic device 14 has sealing and/or hermiticity respectively defined by a leakage rate of helium below $10^{-5}$ and $10^{-6}$ cm$^3$ per second for an upstream-downstream pressure difference of $10^5$ Pa for 2 minutes, because according to the invention the external diameter D of the main microlens is, at ambient temperature slightly larger than the internal diameter d of the bore of ferrule 32 in which the microlens is located. In order to ensure a satisfactory setting, without leading to defects in the microlens 30, the ratio D/d is chosen between 1.005 and 1.020 at ambient temperature.

According to the invention, the auxiliary microlens 46 transforms the light beam leaving end 13 of optical fibre 12 into a parallel light beam, which is then focussed by the microlens 30 into the pyrotechnic substance 24. During a laser firing, the charge 24 is ignited and forms the seat of a shockwave, which is propagated through the charge 24 consequently leading to the destruction of the thin wall 22 of body 18 and therefore the firing or detonation of the main charge contained in support 16. According to the invention, the device 20 shown in FIG. 2 is a miniature device. For example, it is in the form of a photopyrotechnic device having a body 18 with an external diameter of 12 mm downstream of the flange 39, an internal diameter of 4.2 mm and a length of 19.4 mm. The connector 34 has a maximum external diameter of 6.4 mm and a minimum internal diameter of 2.9 mm at the microlens 46. At ambient temperature, the ferrule 32 has an external diameter of 3.8 mm, an internal diameter of 1.98 mm and a length of 11.5 mm. The microlens 30 has a diameter of $2 \pm 5 \times 10^{-6}$ mm and a length of 11.5 mm. The microlens 46 has a diameter of 2 mm and a length of 28 mm.

Figure 3:
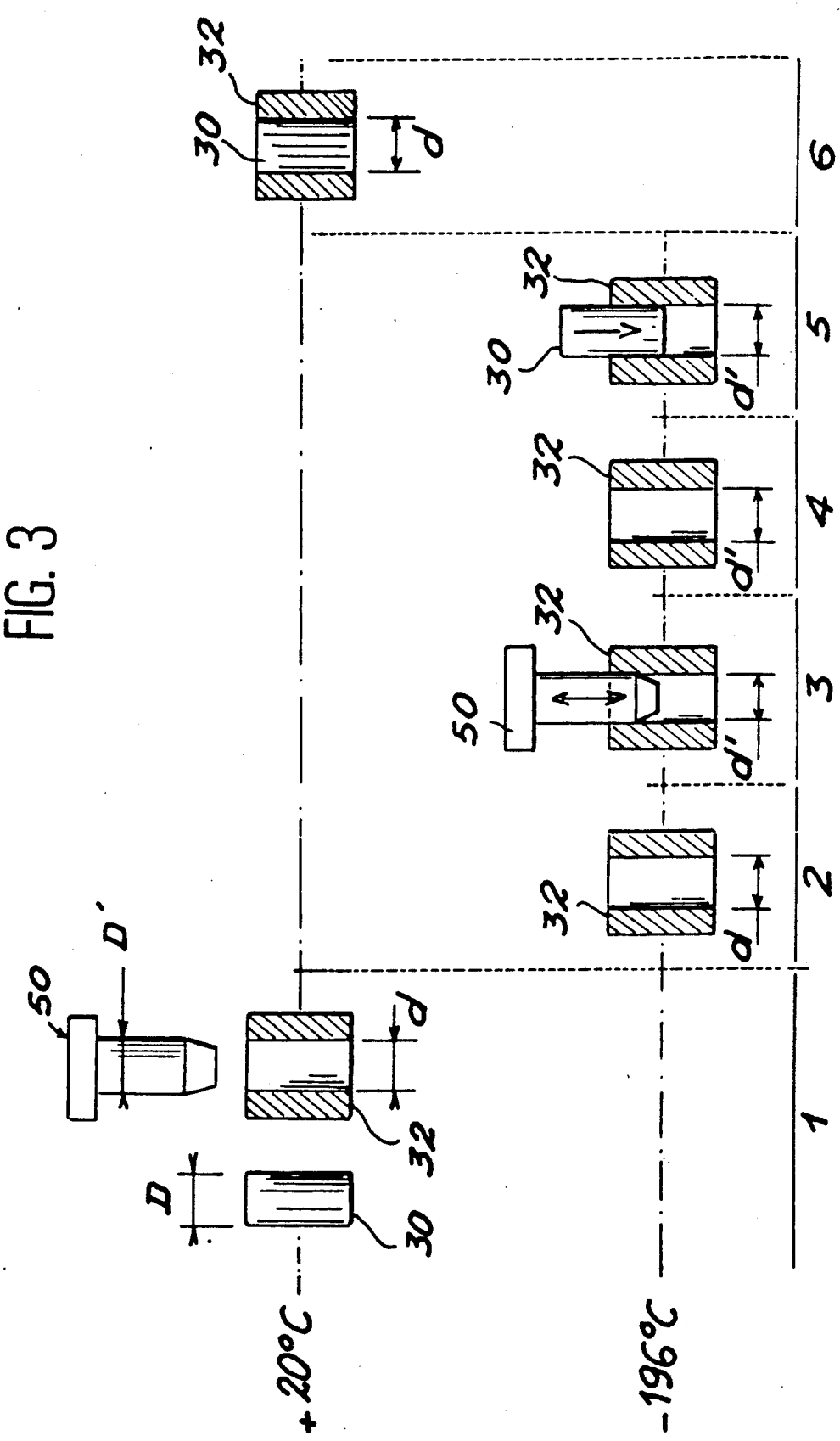
FIG. 3 diagrammatically the process of fitting the main microlens in the shape memory material ferrule according to the invention.

With reference to FIG. 3 a description is given hereinafter of the fitting of the cylindrical microlens 30 within the shape memory alloy ferrule 32. The initial stage is designated 1. At ambient temperature (approximately 20° C.), the shape memory alloy ferrule 32 occupies a memory state (initial phase) in which its internal diameter has the value d, which is smaller than the microlens diameter D. Phase 2 consists of immersing the ferrule 32 in liquid nitrogen at $-196°$ C., so that the material passes into a martensitic crystalline form. With the aid of a cylindrical measuring rod 50 or a ball, whose diameter D' is larger than that of the microlens, ferrule 32 is expanded in such a way that its internal diameter passes to d', which is larger than the microlens diameter D. This expansion takes place at low temperature, whilst maintaining the ferrule 32 in the liquid nitrogen and not at high temperature, as in the case of thermoretractable plastic sheaths. This stage constitutes phase 3 of the fitting process.

Phase 4 of the process consists of removing the measuring rod 50 or the ball from the ferrule 32, still maintained at the temperature of the liquid nitrogen. The microlens 30 is then introduced into the ferrule 32, which is still maintained at low temperature and this stage constitutes phase 5 of the process. The ferrule-microlens assembly is then reheated to ambient temperature. The material constituting the ferrule 32 then reassumes its initial shape. In particular, the internal diameter of the ferrule reassumes its value d, which thus ensures the setting of the microlens.

Figure 4:
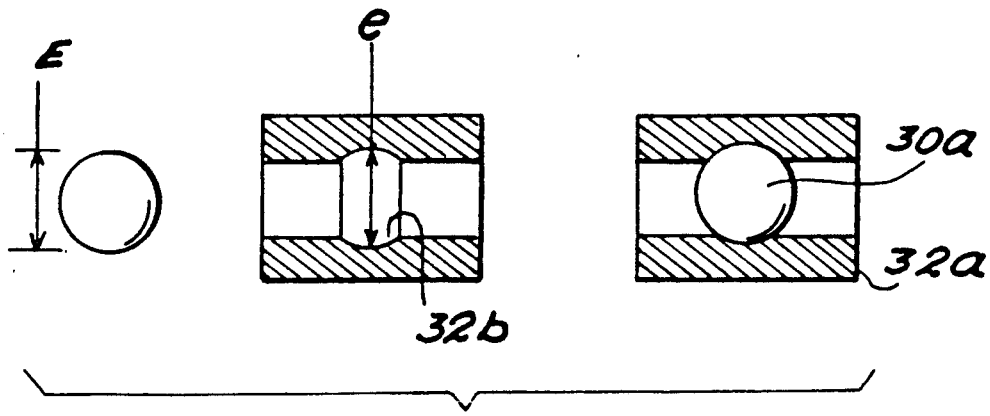
FIG. 4 a constructional variant of the main microlens and the ferrule according to the invention.

In place of a cylindrical, main index gradient microlens 30, it would be possible, as shown in FIG. 4, to use a spherical microlens 30a. In this case, the internal diameter of the shape memory material ferrule 32a is no longer constant and has a widened portion 32b adapted to the shape of the spherical microlens and, at ambient temperature, having an internal diameter e smaller than the diameter E of the spherical microlens.

Figure 5:
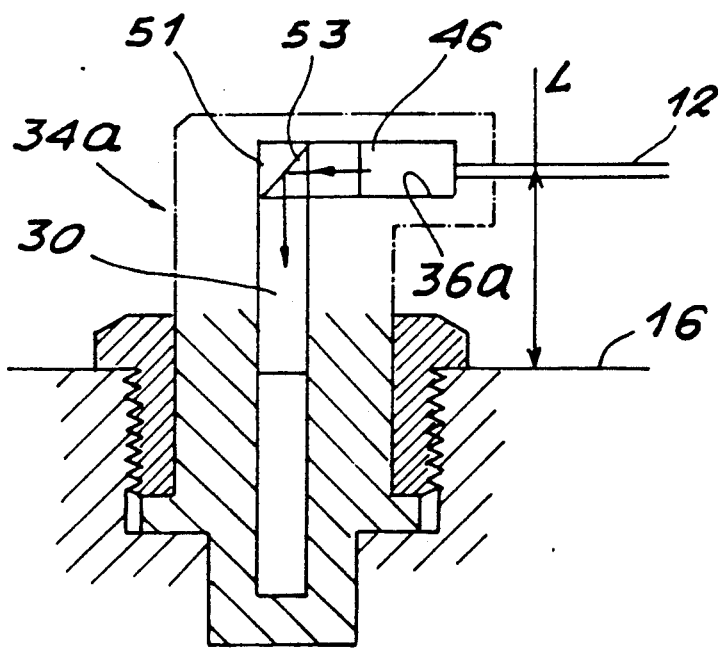
FIG. 5 a variant of the priming device according to the invention.

The priming device described with reference to FIG. 2 has a straight entrance optical connector 34. In a multichannel photopyrotechnic chain (FIG. 1), it may be preferable to use a bent connector 34a, as shown in FIG. 5, with a view to reducing the overall longitudinal dimensions of the photopyrotechnic chain. These dimensions are essentially due to the radius of curvature R (FIG. 1) of the optical fibre, which is $\geq 80$ mm. With a connector bent at right angles, it is possible to reduce the distance L separating the support 16 of the priming device from the optical fibre 12, when it is parallel to the surface of the support, by 8 mm to 120 mm, when everything else is equal.

In this embodiment, the bend 51 of bore 36a of the optical connector has a right-angled prism 53 operating in total reflection for directing the light beam from the auxiliary microlens 46 to the main microlens 30.

Research has made it possible to show that there is a very close correlation between the following parameters: internal diameter of the ferrule, external diameter of the ferrule, roughness of the inner wall of the ferrule, diameter of the main ferrule, which is an imposed parameter and the expansion mode of the internal diameter of the ferrule. Thus, it is important to determine this correlation in order to ensure the imposed sealing and/or hermiticity level without mechanically deteriorating the main lens.

Development tests have made it possible to determine the optimum values of the above parameters for a main lens. Results are given in Table I.

In this table, X corresponds to the tests performed. In addition, the expansion of the shape memory material ferrule was carried out in the manner described hereinbefore at $-196°$ C., the measuring rod or ball used for the expansion having an external diameter of 2.02 mm.

Tests A,B,C and D in Table I did not give satisfactory setting results, in view of the fact that the microlens was subject to excessive locking or tightening forces leading to cracks or defects within the microlens. However, tests E and F made it possible to obtain a good quality tightening or fixing (under a pressure of $10^8$ Pa of oil) with little influence of the roughness on the sealing and hermiticity results respectively characterized by a helium leakage rate of $10^{-6}$ and $10^{-5}$ cm$^3$/second.

Identical results to tests E and F were obtained with a microlens with a diameter of 1.8 mm, a ferrule with an internal diameter of 1.78 mm and an external diameter of 2.5 mm.

These tests were carried out with treated glass microlenses and Cu-Zn-Al ferrules with the weight percentages respectively 68, 28 and 4. This shape memory material was used with a nonreversing effect and without any dismantling possibility in order to comply with the requirements of the device. The measuring rod 50 and ball were made from stainless steel, which is a material retaining its dimensional characteristics on passing from ambient temperature to the temperature of the liquid nitrogen.

The photopyrotechnic device according to the invention must have a sealing and/or hermiticity, following the fitting of the main microlens-ferrule assembly, which are completely satisfactory, a non-deformation and non-attenuation of the laser beam during its passage through the main microlens, following the setting of the latter, and a preservation of the optical and mechanical characteristics in a temperature range of $-110°$ to $+100°$ C. over a period of up to 10 years.

In order to prove the results provided by the invention, the Inventors carried out a certain number of validation tests which are given hereinafter.

a) Sealing and/or hermiticity measurement

Leakage rate measurement tests performed on a mass spectrometer gave results broken down into several configurations. In particular, a leakage rate below $10^{-7}$ cm$^3$ of helium per second was obtained in the case of the set E (cf. Table) for an internal ferrule roughness of $0.8 \times 10^{-6}$ m.

b) Measurement of the non-deformation of the laser beam

This measurement was carried out with the device shown in FIG. 6. The image of the exit face of an optical fibre 52 with a core diameter of 600 micrometers was taken at a magnification of 1 using two identical index gradient glass microlenses 54 and 56. The index at the centre $n_o$ of said microlenses is 1.6 and decreases towards the periphery in accordance with the law $n_r = n_o(1 - Ar^2/2)$ in which $\sqrt{A}$ is the constant four-dimensional gradient of the microlens and r its radius.

According to the invention, the microlens 56 serving as the main microlens was mounted in a Cu-Al-Zn ferrule, as described with reference to FIG. 3. Microlens 54 serves as the auxiliary microlens. The light emitted by a light emitting diode 60 is coupled to the optical fibre 52 by a base.

The first microlens 54 is fixed by adhesion to the end of the optical fibre 52. This assembly is held in a micrometric displacement module 57, so as to be alignable with the microlens 56 to be checked and which is kept fixed.

A second micrometric displacement module 61 makes it possible to displace an optical fibre 62, which is finer than the optical fibre 52 (core diameter 85 micrometers) in order to measure the diameter of the light spot leaving the microlens 58. The distance between the measurement fibre 62 and the microlens 56 to be checked is approximately 20 micrometers and that separating the two microlens 54 and 56 is approximately 0.1 mm.

A plotting table 64 makes it possible to visually display the profile of the light received by the fibre 62, as a function of its displacement in X and Y. This plotting table 64 is connected to a photometer 66 transforming the light signal received by fibre 62 into an electric signal.

The results obtained are summarized in the following Table II, as a function of the internal diameter of the ferrule, prior to its low temperature expansion.

The measurement results Table II shows that the performance of the setting process according to the invention with respect to the main microlens has little influence on the optical path of the light beam.

c) Measurement of the attenuation of the light beam

For these measurements, the arrangement is identical to that shown in FIG. 6, except that the cell of the photometer 66 is positioned at the exit from the microlens 56 in place of the optical measurement fibre 62. For each measurement, the attenuation is expressed in decibels and as a percentage, taking as the reference the value of the light power leaving the microlens 54.

The results obtained are given in Table III as a function of the internal diameter of the ferrule, prior to expansion at low temperature.

The measurement results Table III shows that the performance of the setting process for the main microlens according to the invention has little influence on the attenuation of the light beam.

d) Behaviour in climatic environment

Different photopyrotechnic devices according to the invention underwent two types of climatic test, namely temperature cycles (dry heat) consisting of four 6 hour cycles each with a level at $-10°$ C. and another at $+40°$ C. with a variation rate of $2°$ C./minute between these levels and then thermal shocks consisting of stabilizing the assembly for 15 minutes at $20°$ C. and then heating it in one minute to $100°$ C. on 5 occasions.

The characteristics before and after these climatic tests revealed no deterioration of the results given in Tables II and III.

TABLE I

Setting Tests.
Constant parameter: Microlens diameter: 2 mm $\pm$ 5.10$^{-6}$ m

| Ferrule internal diameter Ambient T. (mm) | Ferrule external diameter (mm) | Ferrule roughness 10$^{-6}$ m | | Expansion | | Observations |
|---|---|---|---|---|---|---|
| | | 1.6 | 0.8 | Measuring rod | Ball | |
| 1.96 | 3.4 | X | | X | | A |
| | 3.6 | X | | X | | B |
| | 3.8 | X | | X | | C |
| 1.97 | 3.4 | | X | X | X | D |
| | 3.8 | X | X | X | X | E |
| 1.98 | 3.8 | X | | X | | F |

X: Tests performed

TABLE II

| Ferrule internal diameter before expansion (mm) | Optical fibre image diameter (10$^{-6}$ m) through the microlens | |
|---|---|---|
| | Before setting | After setting |
| 1.98 | from 565 to 570 | 581 |
| 1.97 | 565 | 571 |
| 1.96 | from 565 to 570 | from 570 to 574 |

TABLE III

| Ferrule internal diameter before expansion (mm) | Attenuation due to the microlens | | | |
|---|---|---|---|---|
| | Before setting | | After setting | |
| | db | % | db | % |
| 1.98 | 0.19 | −4.3 | 0.14 | −3.2 |
| 1.97 | 0.20 | −4.5 | 0.25 | −5.6 |
| 1.96 | 0.20 | −4.5 | 0.19 | −4.3 |

I claim:

1. Miniature photopyrotechnic priming device (14) having a hollow body (18) sealed at one end (22) and serving to receive a pyrotechnic substance (24), a rigid index gradient microlens (30) inserted in a shape memory material ferrule (32) mounted (36, 38, 40, 44) at the entrance (28) of the hollow body (18) and ensuring a tight, hermetic fixing of the microlens within said body, said microlens focusing a high energy light beam of given wavelength on the pyrotechnic substance, and memory material ferrule (32) having an internal diameter at ambient temperature, smaller than the microlens diameter and being made of a material selected from the group consisting of a metal and a metal alloy.

2. Device according to claim 1, characterized in that the microlens has a shape selected from cylindrical and spherical and has a diameter smaller than 3 mm.

3. Device according to claim 1, characterized in that the shape memory material is a non-reversing memory material.

4. Device according to claim 1, characterized in that the ratio of the microlens diameter D to the internal diameter d of the ferrule, at ambient temperature, is $1,005 \leq D/d < 1.020$.

5. Device according to claim 1, characterized in that the ferrule thickness is approximately 0.9 mm, at ambient temperature.

6. Device according to claim 1, characterized in that the body (18) is in one piece.

7. Device according to claim 1, characterized in that sealing means (40) are provided between the body and the ferrule.

8. Device according to claim 1, characterized by further comprising an auxiliary microlens fitted upstream of the microlens (30) which is inserted in ferrule (32) to make the light beam parallel.

9. Device according to claim 1, characterized in that an optical connector (48) is installed at the entrance of the body, partly ensuring the maintaining in place of the ferrule in the body and the supply of the light beam.

10. Device according to claim 9, characterized in that the connector is bent and has a means (53) for directing the light beam onto the microlens (30) inserted in ferrule (32).

11. Device according to claim 9, characterized in that sealing means (40) are provided between the connector and the body.

12. Pyrotechnic functional chain incorporating a laser source (10) for emitting a laser beam (48) of a predetermined wavelength, at least one photopyrotechnic priming device (14) and an optical cable (12) for carrying the laser beam emitted by the source to the priming device, said priming device having a hollow body (18) sealed at one end (22) and serving to receive a pyrotechnic substance (24), a rigid index gradient microlens (30) inserted in a shape memory material ferrule (32) mounted (36, 38, 40, 44) at the entrance (28) of the hollow body (18) and ensuring a tight, hermetic fixing of the microlens within said body, said microlens focussing a high energy light beam of given wavelength on the pyrotechnic substance and said memory material ferrule (32) having an internal diameter at ambient temperature, smaller than the microlens diameter and being made of a material selected from the group consisting of a metal and a metal alloy.

13. A process for fitting an index gradient rigid microlens (30) in a shape memory material ferrule (32) for fitting in a photopyrotechnic priming device, said shape memory material being selected from the group consisting of a metal and a metal alloy, said process consisting of using a shape memory material ferrule (32) having at a first temperature a first crystallographic phase, the internal diameter (d) of the ferrule at said first temperature being smaller than the diameter (D) of the microlens, lowering the temperature of the ferrule to a second temperature at which the shape memory material has a second crystallographic phase, introducing into the ferrule maintained at said second temperature a cylindrical measuring rod (50) having a diameter (D') larger than the diameter (D) of the microlens, removing the measuring rod from the ferrule (32) maintained at the second temperature, introducing the microlens (30) into the ferrule (32) maintained at the second temperature and reheating the ferrule-microlens assembly to the first temperature.

14. A process for fitting an index gradient rigid microlens (30) in a shape memory material ferrule (32) for fitting in a photopyrotechnic priming device, said shape memory material being selected from the group consisting of a metal and a metal alloy, said process consisting of using a shape memory material ferrule (32) having at a first temperature a first crystallographic phase, the internal diameter (d) of the ferrule at said first temperature being smaller than the diameter (D) of the microlens, lowering the temperature of the ferrule to a second temperature at which the shape memory material has a second crystallographic phase, introducing into the ferrule maintained at said second temperature a ball having a diameter (D') larger than the diameter (D) of the microlens, removing the ball from the ferrule (32) maintained at the second temperature, introducing the microlens (30) into the ferrule, and reheating the ferrule-microlens assembly to the first temperature.

* * * * *

UNITED STATES PATENT AND TRADEMARK OFFICE
CERTIFICATE OF CORRECTION

PATENT NO. : 5,052,300
DATED : October 1, 1991
INVENTOR(S) : Alain Paul Josse It is certified that error appears in the above-identified patent and that said Letters Patent is hereby corrected as shown below:

Claim 4, Col. 11, line 17 "1,005" should be "1.005".

Signed and Sealed this

Twenty-third Day of November, 1993

Attest:

BRUCE LEHMAN

*Attesting Officer*    *Commissioner of Patents and Trademarks*